United States Patent
Li et al.

(10) Patent No.: US 11,665,678 B2
(45) Date of Patent: May 30, 2023

(54) ANTENNA CONFIGURATION IN A COMMUNICATION NETWORK

(71) Applicant: Telefonaktiebolaget LM Ericsson (publ), Stockholm (SE)

(72) Inventors: Gen Li, Beijing (CN); Ming Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 77 days.

(21) Appl. No.: 16/769,124

(22) PCT Filed: Dec. 21, 2017

(86) PCT No.: PCT/CN2017/117818
§ 371 (c)(1),
(2) Date: Jun. 2, 2020

(87) PCT Pub. No.: WO2019/119364
PCT Pub. Date: Jun. 27, 2019

(65) Prior Publication Data
US 2021/0227542 A1 Jul. 22, 2021

(51) Int. Cl.
*H04W 72/04* (2009.01)
*H04W 72/0453* (2023.01)
*H04B 7/06* (2006.01)
*H04W 72/02* (2009.01)

(52) U.S. Cl.
CPC ...... *H04W 72/0453* (2013.01); *H04B 7/0608* (2013.01); *H04W 72/02* (2013.01)

(58) Field of Classification Search
CPC .............. H04W 72/0453; H04W 72/02; H04B 7/0608; H04B 7/12
See application file for complete search history.

(56) References Cited

U.S. PATENT DOCUMENTS

| | | | |
|---|---|---|---|
| 10,314,055 B1* | 6/2019 | Marupaduga | H04L 5/0069 |
| 2010/0069122 A1* | 3/2010 | Ito | H04L 25/0224 455/562.1 |
| 2010/0157858 A1 | 6/2010 | Lee et al. | |
| 2010/0222051 A1* | 9/2010 | Watanabe | H04B 7/0613 455/422.1 |
| 2012/0021693 A1* | 1/2012 | Wintzell | H04B 7/0874 455/67.11 |
| 2013/0072135 A1 | 3/2013 | Banerjea et al. | |

(Continued)

FOREIGN PATENT DOCUMENTS

WO 2013149189 A1 10/2013

OTHER PUBLICATIONS

62567133,Specification,Oct. 2, 2017 (Year: 2017).*

(Continued)

*Primary Examiner* — Yu-Wen Chang
(74) *Attorney, Agent, or Firm* — Sage Patent Group

(57) ABSTRACT

A method for communications is disclosed. The method includes determining, at a terminal device, status information of at least one of a first frequency band and a second frequency band. The terminal device is operable in the first frequency band and the second frequency band. The method further includes performing an allocation of multiple antennas of the terminal device between the first frequency band and the second frequency band, based at least in part on the status information.

26 Claims, 6 Drawing Sheets

(56) References Cited

U.S. PATENT DOCUMENTS

| | | | |
|---|---|---|---|
| 2015/0010099 A1 | 1/2015 | Lin et al. | |
| 2015/0188617 A1* | 7/2015 | Kuo | H04B 7/0608 375/295 |
| 2015/0237548 A1* | 8/2015 | Luo | H04W 36/06 370/329 |
| 2015/0245316 A1 | 8/2015 | Ali et al. | |
| 2015/0304011 A1* | 10/2015 | Ponnuswamy | H04B 7/0617 370/329 |
| 2015/0341863 A1* | 11/2015 | Zhang | H04W 28/18 370/311 |
| 2015/0365157 A1* | 12/2015 | Yang | H04W 74/006 370/329 |
| 2015/0381291 A1* | 12/2015 | Mahajan | H04W 24/08 370/252 |
| 2016/0192395 A1* | 6/2016 | Yoo | H04W 16/14 370/329 |
| 2017/0289817 A1 | 10/2017 | Shekalim | |
| 2018/0077683 A1* | 3/2018 | Rico Alvarino | H04W 52/241 |
| 2018/0109150 A1* | 4/2018 | Khan | H02J 50/80 |
| 2018/0261928 A1* | 9/2018 | Wang | H01Q 21/20 |
| 2018/0263038 A1* | 9/2018 | Zhou | H04W 52/346 |
| 2019/0074854 A1* | 3/2019 | Raghavan | H04B 1/3838 |
| 2019/0104477 A1* | 4/2019 | MolavianJazi | H04L 5/0051 |
| 2019/0115791 A1* | 4/2019 | Zeine | H02J 7/025 |
| 2019/0140340 A1* | 5/2019 | Ramasamy | H01Q 25/00 |
| 2019/0166563 A1* | 5/2019 | Ansari | H04B 7/0617 |
| 2019/0372650 A1* | 12/2019 | Takii | H04W 24/08 |
| 2020/0145079 A1* | 5/2020 | Marinier | H04B 7/0456 |

OTHER PUBLICATIONS

European Search Report for European Patent Application No. 17935497.2 dated Jul. 12, 2021.

International Search Report and Written Opinion of the International Searching Authority for PCT International Application No. PCT/CN2017/117818 dated Jun. 27, 2018.

* cited by examiner

ANTENNA CONFIGURATION IN A COMMUNICATION NETWORK

CROSS REFERENCE TO RELATED APPLICATION

This application is a 35 U.S.C. § 371 national stage application of PCT International Application No. PCT/CN2017/117818 filed on Dec. 21, 2017, the disclosure and content of which is incorporated by reference herein in its entirety.

FIELD OF THE INVENTION

The present disclosure generally relates to communication networks, and more specifically, to antenna configuration in a communication network.

BACKGROUND

This section introduces aspects that may facilitate a better understanding of the disclosure. Accordingly, the statements of this section are to be read in this light and are not to be understood as admissions about what is in the prior art or what is not in the prior art.

Mobile broadband may continue to drive some demands for big overall traffic capacity and huge achievable end-user data rates in a wireless communication network. Many scenarios for network services in the future may require data rates of up to 10 Gbps in local areas. These demands for very high system capacity and end-user data rates can be met by networks where distances between access nodes may range from a few meters in indoor deployments up to roughly 50 meters in outdoor deployments, for example, by next generation communication networks with an infrastructure density considerably higher than the densest networks of today. Besides the traditional licensed exclusive spectrum, the next generation communication systems such as fifth generation (5G) and new radio (NR) systems are also expected to be operable on the unlicensed spectrum which may be sharable. It may be possible for a network operator to own a certain amount of licensed carriers while it could use some unlicensed carriers. Thus, it is desirable to arrange operations on different frequency bands such as licensed and unlicensed bands in a communication network efficiently.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Multi-antenna technology brings significant improvements in system performance and energy efficiency by focusing the transmission and reception of signal energy into certain spatial regions. In a wireless communication network such as 5G or NR, radio devices are expected to operate with multiple antennas to obtain large beamforming gains. When the multi-antenna technology is employed in the wireless communication network which may be able to support operations on the licensed band and/or the unlicensed band, there may be a need to deploy multiple antennas on different bands in a more efficient way.

The present disclosure proposes a solution of antenna configuration in a communication network, which may enable multiple antennas to be shared between different frequency bands such as licensed and unlicensed bands, so as to improve system performance and energy efficiency of the communication network.

According to a first aspect of the present disclosure, there is provided a method implemented at a terminal device. The method may comprise determining status information of at least one of a first frequency band and a second frequency band. The terminal device may be operable in the first frequency band and the second frequency band. The method may further comprise performing an allocation of multiple antennas of the terminal device between the first frequency band and the second frequency band, based at least in part on the status information.

In accordance with an exemplary embodiment, the status information may comprise at least one of the followings: a radiated power limit in the second frequency band; channel quality of the terminal device in the first frequency band; and availability of resources in the first frequency band for the terminal device.

In accordance with an exemplary embodiment, the method according to the first aspect of the present disclosure may further comprise transmitting terminal configuration information to a network node. The terminal configuration information may indicate the allocation of the multiple antennas of the terminal device between the first frequency band and the second frequency band.

In accordance with an exemplary embodiment, the method according to the first aspect of the present disclosure may further comprise transmitting a terminal update report to the network node, in response to a change of antenna allocation for the terminal device in at least one of the first frequency band and the second frequency band. The terminal update report may indicate the change of the antenna allocation for the terminal device.

In accordance with an exemplary embodiment, the method according to the first aspect of the present disclosure may further comprise receiving network configuration information from a network node. The network configuration information may indicate an allocation of multiple antennas of the network node between the first frequency band and the second frequency band.

In accordance with an exemplary embodiment, the method according to the first aspect of the present disclosure may further comprise determining a link adaptation process for the terminal device, based at least in part on the network configuration information.

In accordance with an exemplary embodiment, the method according to the first aspect of the present disclosure may further comprise receiving a network update report from the network node. The network update report may indicate a change of antenna allocation for the network node in at least one of the first frequency band and the second frequency band.

In accordance with an exemplary embodiment, the method according to the first aspect of the present disclosure may further comprise adjusting the link adaptation process for the terminal device, based at least in part on the network update report.

According to a second aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus. The apparatus may comprise a determining unit and a performing unit. In accordance with some exemplary embodiments, the determining unit may be operable to carry out at least the determining step of the method according to the first aspect of the present disclosure. The performing unit may be operable to carry out at least the performing step of the method according to the first aspect of the present disclosure.

According to a fifth aspect of the present disclosure, there is provided a method implemented at a network node. The method may comprise determining status information of at least one of a first frequency band and a second frequency band. The network node may be operable in the first frequency band and the second frequency band. The method may further comprise performing an allocation of multiple antennas of the network node between the first frequency band and the second frequency band, based at least in part on the status information.

In accordance with an exemplary embodiment, the status information may comprise at least one of the followings: a radiated power limit in the second frequency band; availability of resources in the second frequency band for the network node; and channel quality of terminal devices served by the network node in the first frequency band.

In accordance with an exemplary embodiment, the method according to the fifth aspect of the present disclosure may further comprise transmitting network configuration information to a terminal device. The network configuration information may indicate the allocation of the multiple antennas of the network node between the first frequency band and the second frequency band.

In accordance with an exemplary embodiment, the method according to the fifth aspect of the present disclosure may further comprise transmitting a network update report to the terminal device, in response to a change of antenna allocation for the network node in at least one of the first frequency band and the second frequency band. The network update report may indicate the change of the antenna allocation for the network node.

In accordance with an exemplary embodiment, the method according to the fifth aspect of the present disclosure may further comprise receiving terminal configuration information from a terminal device. The terminal configuration information may indicate an allocation of multiple antennas of the terminal device between the first frequency band and the second frequency band.

In accordance with an exemplary embodiment, the method according to the fifth aspect of the present disclosure may further comprise determining a link adaptation process for the network node, based at least in part on the terminal configuration information.

In accordance with an exemplary embodiment, the method according to the fifth aspect of the present disclosure may further comprise receiving a terminal update report from the terminal device. The terminal update report may indicate a change of antenna allocation for the terminal device in at least one of the first frequency band and the second frequency band.

In accordance with an exemplary embodiment, the method according to the fifth aspect of the present disclosure may further comprise adjusting the link adaptation process for the network node, based at least in part on the terminal update report.

According to a sixth aspect of the present disclosure, there is provided an apparatus. The apparatus may comprise one or more processors and one or more memories comprising computer program codes. The one or more memories and the computer program codes may be configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus. The apparatus may comprise a determining unit and a performing unit. In accordance with some exemplary embodiments, the determining unit may be operable to carry out at least the determining step of the method according to the fifth aspect of the present disclosure. The performing unit may be operable to carry out at least the performing step of the method according to the fifth aspect of the present disclosure.

In accordance with some exemplary embodiments, the first frequency band may comprise a licensed band and the second frequency band may comprise an unlicensed band.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
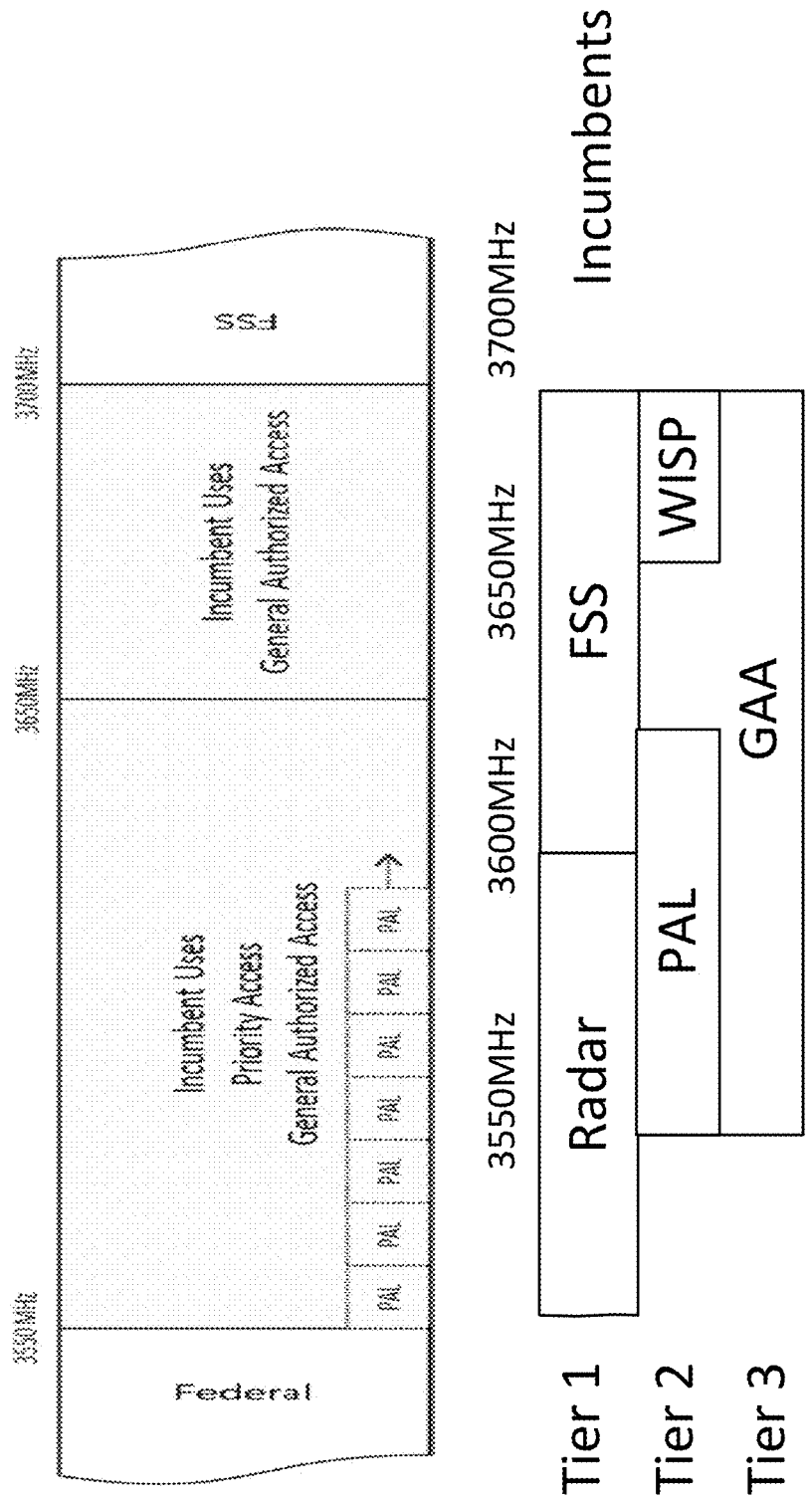
FIG. 1 is a diagram illustrating an exemplary communication band according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as NR, long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a mobile management entity (MME), multi-cell/multicast coordination entity (MCE), a gateway, a server, a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, MCEs, core network nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. To meet dramatically increasing network requirements on traffic capacity and data rates, one interesting option for communication technique development is to allow a wireless communication network such as a NR or 5G system to be operable on the unlicensed band, besides the licensed band. By aggregation of licensed and unlicensed carriers, a radio device may benefit from the additional transmission capacity provided by the unlicensed band.

FIG. 1 is a diagram illustrating an exemplary communication band according to an embodiment of the present disclosure. The embodiment shown in FIG. 1 illustrates the use of 3.5 GHz band which may be a candidate band for licensed and/or unlicensed communications. It will be appreciated that there may be other candidate bands for licensed and/or unlicensed communications, such as 5 GHz, 37 GHz, 60 GHz, etc. FIG. 1 only shows some exemplary band operations for communication services, and other appropriate band operations also may be applied according to regulatory requirements.

As shown in FIG. 1, Tier 1 band may be used for radar and fixed satellite service (FSS) communications, a part of Tier 2 band may be used for priority access license (PAL) and wireless Internet service provider (WISP) communications, and general authorized access (GAA) communications can be supported by Tier 3 band and another part of Tier 2 band. The communications in Tier 1 band may have a higher priority than the communications in Tier 2 band, while the communications in Tier 3 band may have a lower priority than those in Tier 2 band. In accordance with an exemplary embodiment, some mobile communication systems may be operated in Tier 2 band as the licensed band or Tier 3 band as the unlicensed band. In general, there may be an equivalent isotropic radiated power (EIRP) limit for the communications in the unlicensed band. Similarly, an EIRP limit also may be taken into account in the licensed band, although its influence in the licensed band is not as significant as in the unlicensed band.

Figure 2:
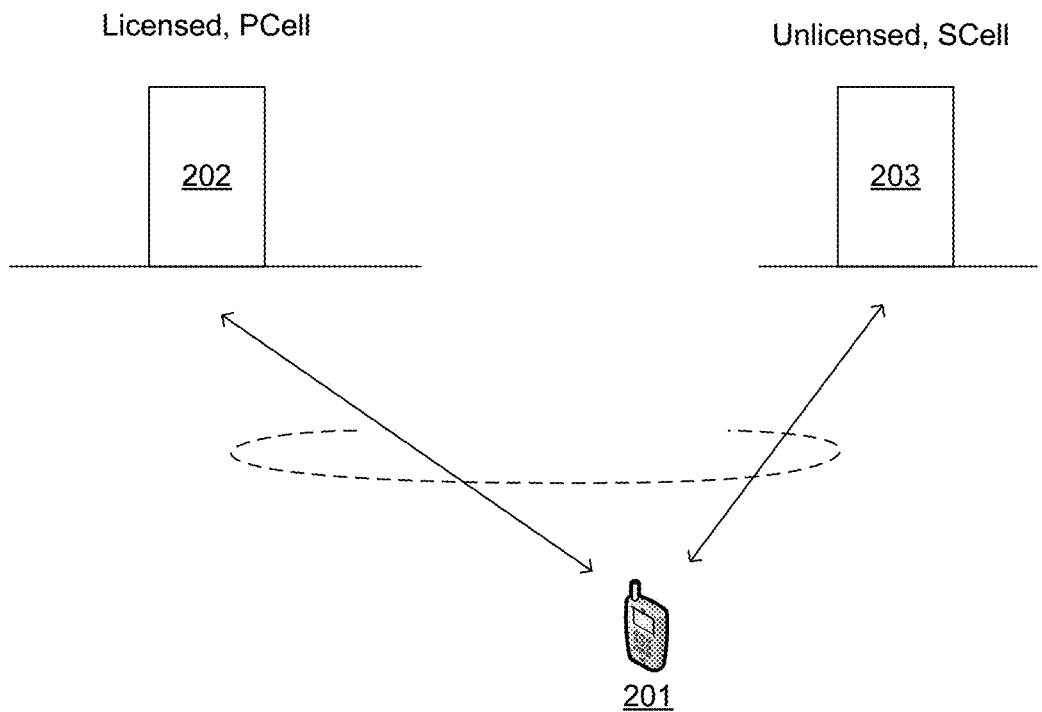
FIG. 2 is a diagram illustrating an example of licensed-assisted access (LAA) according to an embodiment of the present disclosure.

FIG. 2 is a diagram illustrating an example of licensed-assisted access (LAA) according to an embodiment of the present disclosure. The LAA framework may be built on the carrier aggregation solutions for a LTE network to access the additional bandwidth in the unlicensed band. For simplicity, FIG. 2 only depicts some exemplary elements such as a UE 201, a primary cell (PCell) 202, and a secondary cell (SCell) 203. It could be appreciated that LAA technology also may be applicable to other suitable network scenarios in which different numbers of network elements or devices may be involved.

As illustrated in FIG. 2, the LTE network can configure the UE 201 to aggregate additional SCells (such as the SCell 203) using frequency carriers in the unlicensed band. The PCell 202 may retain the exchange of essential control messages and can provide always-available robust spectrum for real-time or high-value traffics. The PCell 202 also can provide mobility handling and management for the UE 201 via the high-quality licensed band in a LTE radio access network with wide coverage. The aggregated SCells in the unlicensed band, when available, may be utilized as a bandwidth booster to serve, for example, best effort traffics. The SCell 203 in the LAA network may mainly operate in downlink-only (DL-only) mode. According to an exemplary embodiment, 3.5 GHz band and/or 5 GHz band may be used as the operation band for the LAA network.

As mentioned previously, a wireless communication network such as NR or 5G which can be operable on the licensed and unlicensed bands may employ the multi-antenna technology to obtain more performance gain. Through the use of a large number of service antennas which are operated fully coherently and adaptively, the multi-antenna technology such as massive multiple-input multiple-output (MIMO) can bring prominent improvements in data throughput and energy efficiency, particularly when MIMO is combined with simultaneous scheduling of a large number of user terminals (e.g., tens or hundreds).

Figure 3:
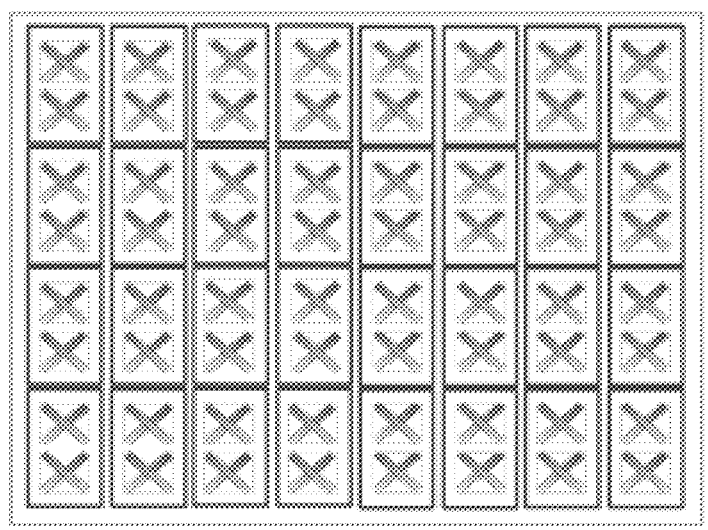
FIG. 3 is a diagram illustrating an example of multi-antenna configuration according to an embodiment of the present disclosure.

FIG. 3 is a diagram illustrating an example of multi-antenna configuration according to an embodiment of the present disclosure. The example shown in FIG. 3 may correspond to an active antenna system (AAS) radio with 64 antennas. For digital beamforming, 64 radio frequency (RF) chains may be used where each antenna is connected to one RF chain. It will be appreciated that the multi-antenna configuration shown in FIG. 3 is just as an example, and in practice the AAS radio may be configured with more or less antennas suitable to support MIMO communications.

In general, MIMO can be used for the time division duplex (TDD) operation, but it also may be potentially applied in the frequency division duplex (FDD) operation. Many benefits may be achieved by applying MIMO in a wireless communication network, for example, large data throughput, the extensive use of inexpensive low-power components, reduced latency, simplification of the media access control (MAC) layer, and robustness to interference and intentional jamming.

However, when a radio device with multiple antennas or RF chains is employed in a wireless communication network which may be able to use different frequency bands such as licensed and unlicensed bands to support communication services, it may be desirable to introduce an effective solution to configure or allocate the multiple antennas between different frequency bands.

In the proposed solution according to some exemplary embodiments, a radio device (such as a network node or a terminal device) may be operable in at least two frequency bands (such as licensed and unlicensed bands) simultaneously with multiple antennas or RF chains. According to some exemplary embodiments, the proposed solution can enable the multiple antennas or RF chains to be shared between different frequency bands, for example, adaptive to one or more channel statuses of at least one frequency band. In this way, the flexibility of antenna configuration may be increased, and the total system performance such as capacity and/or throughput may be improved.

It is noted that some embodiments of the present disclosure are mainly described in relation to LTE or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4:
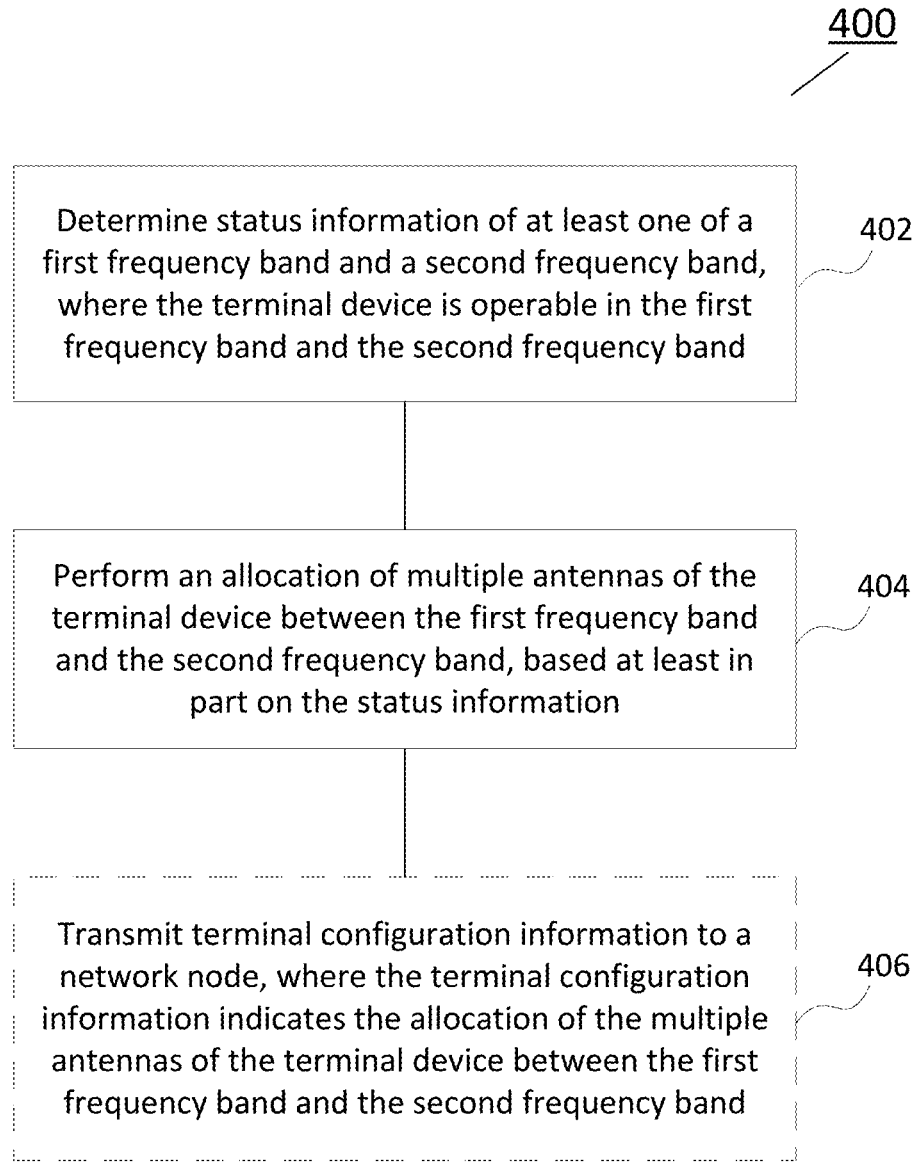
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by an apparatus implemented in a terminal device or communicatively coupled to a terminal device. In accordance with an exemplary embodiment, the terminal device such as a UE may be equipped with multiple antennas to apply MIMO technology. Radio resources in different frequency bands such as licensed and unlicensed bands may be utilized by the terminal device to support communications with a network node such as an eNB or a gNB.

According to the exemplary method 400 illustrated in FIG. 4, the terminal device can determine status information of at least one of a first frequency band and a second frequency band, as shown in block 402. In accordance with some exemplary embodiments, the terminal device may be operable in the first frequency band and the second frequency band. The first frequency band and the second frequency band may refer to different types of frequency bands for wireless communications. According to an exemplary embodiment, the first frequency band may comprise a licensed band and the second frequency band may comprise an unlicensed band. It will be appreciated that the first frequency band and the second frequency band also may refer to different parts of the same type of the frequency band, depending on various application scenarios.

In accordance with an exemplary embodiment, the status information as mentioned in block 402 may comprise at least one of the followings: a radiated power limit in the second frequency band; channel quality of the terminal device in the first frequency band; and availability of resources in the first frequency band for the terminal device. It could be understood that various status information of the first frequency band and/or the second frequency band may be represented or indicated by channel status or resource configuration in the first frequency band and/or the second frequency band. For example, the radiated power limit may comprise an EIRP limit. The channel quality may be indicated by a signal to interference radio (SIR) value and/or a channel quality indicator (CQI). The availability of resources may be represented by the amount of available resources, which may be related to traffic load. Therefore, the terminal device and/or its serving network node may collect information or perform measurements in different network contexts, in order for determining the required status information of the first frequency band and/or the second frequency band.

According to the exemplary method 400, an allocation of multiple antennas of the terminal device between the first frequency band and the second frequency band may be performed based at least in part on the status information determined by the terminal device, as shown in block 404. In accordance with an exemplary embodiment, an antenna allocation rule associated with at least one of the status information may be predefined and optionally adjusted as required. According to the antenna allocation rule, the terminal device can make adaptive antenna allocation between the first frequency band and the second frequency band.

In accordance with an exemplary embodiment where the antenna allocation rule is associated with the radiated power limit in the second frequency band, the maximum number of antennas allocated in the second frequency band may be determined by the radiated power limit (such as the EIRP limit) in the second frequency band. For example, if the maximum hardware power of an antenna is 20 dBm and the allowed EIRP limit in the unlicensed band is 33 dBm, then the maximum beamforming gain is 10 dB, which implies that the maximum number of antennas in the unlicensed band is 16. In this case, allocating more antennas under the allowed EIRP limit means that the hardware power of the antenna needs to be decreased. Therefore, in order to utilize antenna resources more efficiently, it may be better to take the EIRP limit into account when increasing the number of antennas in the unlicensed band. It could be realized that the EIRP limit in the first frequency band such as the licensed band also may be considered when performing the antenna allocation.

Alternatively or additionally, the antenna allocation rule may be associated with the channel quality of the terminal device in the first frequency band. According to the antenna allocation rule, the channel quality of the terminal device in the first frequency band may be compared with a first quality threshold to determine whether to allocate more antennas in the second frequency band. In accordance with an exemplary embodiment, a UE can learn its channel quality based at least in part on its measured SIR value. If this UE is located in the center of a cell, it usually has a higher SIR value and better channel quality than another UE at the edge of the cell. For example, good channel quality of the UE in the first frequency band (such as the licensed band) means that the modulation and coding scheme (MCS) used for the UE may have already achieved the highest one when a small number of antennas are allocated in the first frequency band. In this case, allocating more antennas in the first frequency band may not further improve service performance. Thus, it may be beneficial to allocate more antennas in the second frequency band, when the channel quality of the terminal device in the first frequency band is above the first quality threshold.

Alternatively or additionally, the antenna allocation rule may be associated with the availability of resources in the first frequency band for the terminal device. According to the antenna allocation rule, the availability of resources in the first frequency band for the terminal device may be compared with a first availability threshold to determine whether to allocate more antennas in the second frequency band. In accordance with an exemplary embodiment, the availability of resources in the licensed band for a UE may become lower when traffic load in the licensed band increases. If the traffic load in the licensed band is high and the UE always schedules little resource, then it would be a waste of antenna resources even though more antennas were allocated in the licensed band. Thus, it may be useful to allocate more antennas in the second frequency band, when the availability of resources in the first frequency band for the terminal device is lower than the first availability threshold.

In accordance with an exemplary embodiment, the diverse status information of the first frequency band and/or the second frequency band may be associated with different priorities or weights to reflect different effects on the antenna allocation of the terminal device. For example, the radiated power limit in the second frequency band may have a higher priority in the antenna allocation rule than other status information. In this case, when a result of antenna allocation according to other status information conflicts with a result of antenna allocation according to the radiated power limit, the final result of antenna allocation may depend on the latter. Optionally, the availability of resources in the first frequency band for the terminal device may have a lower priority than the channel quality of the terminal device in the first frequency band, and accordingly have less influence on the antenna allocation of the terminal device.

In accordance with an exemplary embodiment, the method 400 as illustrated in FIG. 4 may further comprise transmitting terminal configuration information from the terminal device to a network node, as shown in block 406. The terminal configuration information may indicate the allocation of the multiple antennas of the terminal device between the first frequency band and the second frequency band. Based at least in part on the terminal configuration information, the network node can select a proper link adaptation process for the communication between the network node and the terminal device.

Correspondingly, the terminal device as described in connection with FIG. 4 may receive network configuration information from a network node, according to an exemplary embodiment. The network configuration information may indicate an allocation of multiple antennas of the network node between the first frequency band and the second frequency band. Thus, the terminal device can determine a link adaptation process for the communication between the terminal device and the network node, based at least in part on the network configuration information.

Optionally, the method 400 as illustrated in FIG. 4 may further comprise transmitting a terminal update report from the terminal device to the network node, in response to a change of antenna allocation for the terminal device in at least one of the first frequency band and the second frequency band. The terminal update report may indicate the change of the antenna allocation for the terminal device. When the network node is informed of the change of the antenna allocation for the terminal device, the network node can make an adjustment to its link adaptation process accordingly.

Optionally, the terminal device as described in connection with FIG. 4 may receive a network update report from the network node. According to an exemplary embodiment, the network update report may indicate a change of antenna allocation for the network node in at least one of the first frequency band and the second frequency band. As such, the terminal device can adjust its link adaptation process based at least in part on the network update report. For example, the terminal device may start a new process for link adaptation when it receives the network update report from the network node, so that one or more parameters for power control and/or data encoding may be adaptive to the change of antenna allocation for the network node.

Figure 5:
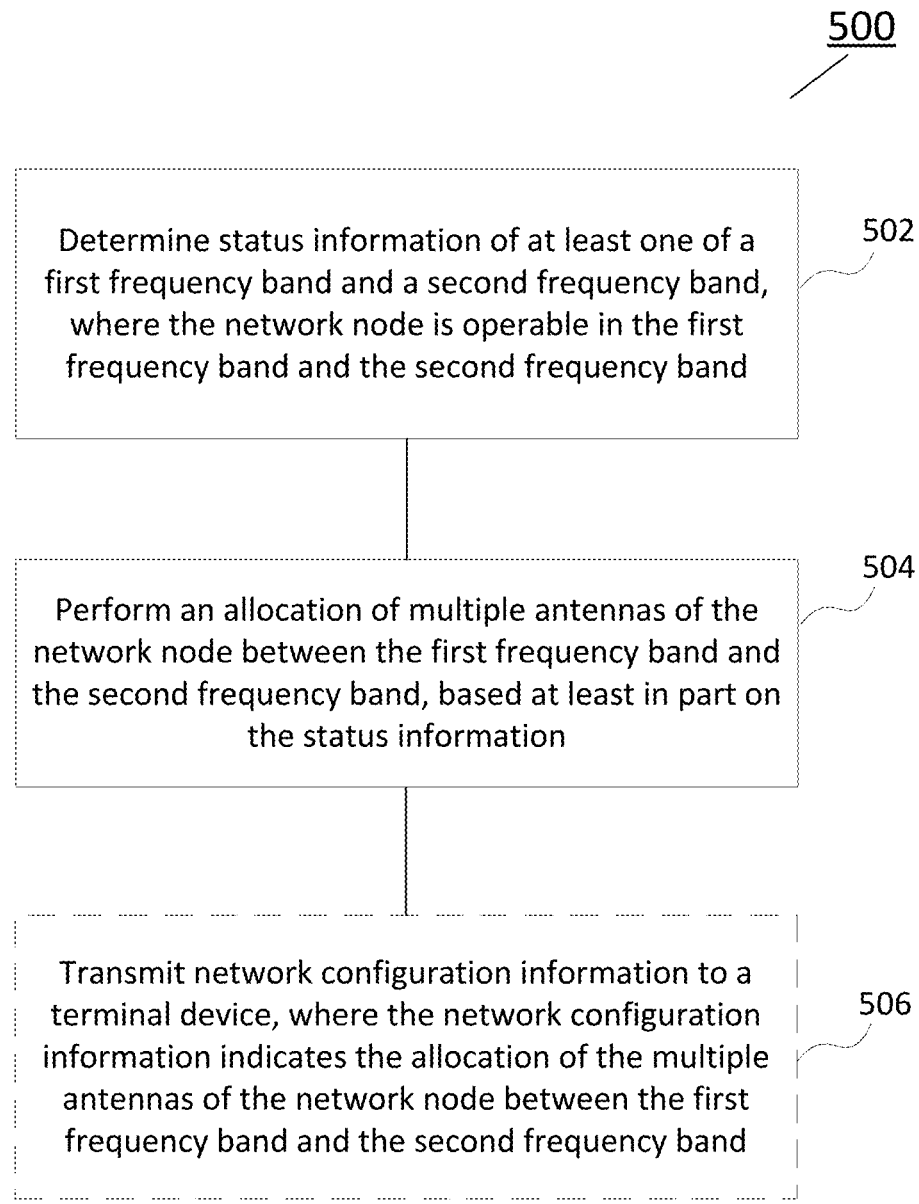
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by an apparatus implemented in a network node or communicatively coupled to a network node. In accordance with an exemplary embodiment, the network node such as an eNB or a gNB may be equipped with multiple antennas to apply MIMO technology. Radio resources in different frequency bands such as licensed and unlicensed bands may be utilized by the network node to support various services for a terminal device such as a UE.

According to the exemplary method 500 illustrated in FIG. 5, the network node can determine status information of at least one of a first frequency band and a second frequency band, as shown in block 502. In accordance with some exemplary embodiments, the network node may be operable in the first frequency band such as a licensed band and the second frequency band such as an unlicensed band.

In accordance with an exemplary embodiment, the status information as mentioned in block 502 may comprise at least one of the followings: a radiated power limit in the second frequency band; availability of resources in the second frequency band for the network node; and channel quality of terminal devices served by the network node in the first frequency band. As described in connection with FIG. 4, various kinds of status information of the first frequency band and/or the second frequency band may be indicated by one or more parameters of channel status or resource configuration. For example, the radiated power limit may comprise an EIRP limit. The availability of resources in a frequency band may be affected by the traffic load in this frequency band. The channel quality of the terminal devices served by the network node may be indicated by a statistic of SIR/CQI values of these terminal devices. The statistic of SIR values may comprise the uplink SIR values of the terminal devices measured by the network node, the downlink SIR values of the terminal devices reported to the network node in the respective CQIs from the terminal devices, or a combination thereof.

According to the exemplary method 500, an allocation of multiple antennas of the network node between the first frequency band and the second frequency band may be performed based at least in part on the status information determined by the network node, as shown in block 504. In accordance with an exemplary embodiment, an antenna allocation rule associated with at least one of the status information may be predefined and optionally adjusted as required. According to the antenna allocation rule, the network node can make adaptive antenna allocation between the first frequency band and the second frequency band.

In accordance with an exemplary embodiment where the antenna allocation rule is associated with the radiated power limit in the second frequency band, the maximum number of antennas allocated in the second frequency band may be determined by the radiated power limit (such as the EIRP limit) in the second frequency band. As described in connection with FIG. 4, in order to utilize antenna resources in a more efficient way, it may be better to take the EIRP limit into account when increasing the number of antennas in a frequency band.

Alternatively or additionally, the antenna allocation rule may be associated with the availability of resources in the second frequency band for the network node. According to the antenna allocation rule, the availability of resources in the second frequency band for the network node may be compared with a second availability threshold to determine whether to decrease the number of antennas allocated in the second frequency band. In accordance with an exemplary embodiment, the second frequency band such as the unlicensed band may be shared by the network node with one or more other network nodes. The more network nodes sharing the unlicensed band, the busier the unlicensed band. The busy status in the unlicensed band may impact the availability of resources in the unlicensed band for the network node. When the busy status in the unlicensed band achieves a certain level, for example, the efficient transmission ratio in a certain monitoring window in the unlicensed band being less than 50% due to a small amount of available resources, the number of antennas allocated in the unlicensed band may be decreased. The reason for this is that the antennas allocated in the unlicensed band would be wasted if the resources in the unlicensed band could not be used. Thus, it may be beneficial to decrease the number of antennas allocated in the second frequency band, when the availability of resources in the second frequency band for the network node is lower than the second availability threshold.

Alternatively or additionally, the antenna allocation rule may be associated with the channel quality of terminal devices served by the network node in the first frequency band. According to the antenna allocation rule, the channel quality of terminal devices served by the network node in the first frequency band may be compared with a second quality threshold to determine whether not to increase the number of antennas allocated in the first frequency band. According to the comparison result, it may be determined how many terminal devices have good channel quality in the first frequency band and thus may achieve the maximum MCS. For example, if the ratio of cell edge UEs in a licensed cell is small, then most of the UEs in the licensed band may achieve the maximum MCS, which means increase of the number of antennas in the licensed band could not bring much gain and there is no need to allocate more antennas in the licensed band. Thus, when a certain number of terminal devices served by the network node in the first frequency band have higher channel quality than the second quality threshold, it may be better not to increase the number of antennas allocated in the first frequency band.

In accordance with an exemplary embodiment, the diverse status information of the first frequency band and/or the second frequency band may be associated with different priorities or weights to reflect different effects on the antenna allocation of the network node. For example, the radiated power limit in the second frequency band, as an important factor affecting the final result of antenna allocation, may have a higher priority than other status information. Optionally, the channel quality of terminal devices served by the network node in the first frequency band may have a lower priority than the availability of resources in the second frequency band for the network node, and thus have less influence on the antenna allocation of the network node.

In accordance with an exemplary embodiment, the method 500 as illustrated in FIG. 5 may further comprise transmitting network configuration information from the network node to a terminal device, as shown in block 506. The network configuration information may indicate the allocation of the multiple antennas of the network node between the first frequency band and the second frequency band. Based at least in part on the network configuration information, the terminal device can select a proper link adaptation process for the communication between the network node and the terminal device.

Correspondingly, the network node as described in connection with FIG. 5 may receive terminal configuration information from a terminal device, according to an exemplary embodiment. The terminal configuration information may indicate an allocation of multiple antennas of the terminal device between the first frequency band and the second frequency band. Based at least in part on the terminal configuration information, the network node can determine a link adaptation process for the communication between the terminal device and the network node.

Optionally, the method 500 as illustrated in FIG. 5 may further comprise transmitting a network update report from the network node to the terminal device, in response to a change of antenna allocation for the network node in at least one of the first frequency band and the second frequency band. The network update report may indicate the change of the antenna allocation for the network node. When the change of the antenna allocation for the network node is signaled to the terminal device, an adaptive adjustment can be made to the link adaptation process used for the terminal device.

Optionally, the network node as described in connection with FIG. 5 may receive a terminal update report from the terminal device. According to an exemplary embodiment, the terminal update report may indicate a change of antenna allocation for the terminal device in at least one of the first frequency band and the second frequency band. Based at least in part on the terminal update report, the network node can adjust its link adaptation process. For example, the network node may start a new process for link adaptation when it receives the terminal update report from the terminal device, so that one or more parameters for power control and/or data encoding may be adaptive to the change of antenna allocation for the terminal device.

It will be realized that parameters, variables, thresholds and settings related to the antenna allocation described herein are just examples. Other suitable network settings, the associated configuration parameters and the specific values thereof may also be applicable to implement the proposed methods.

Figure 6:
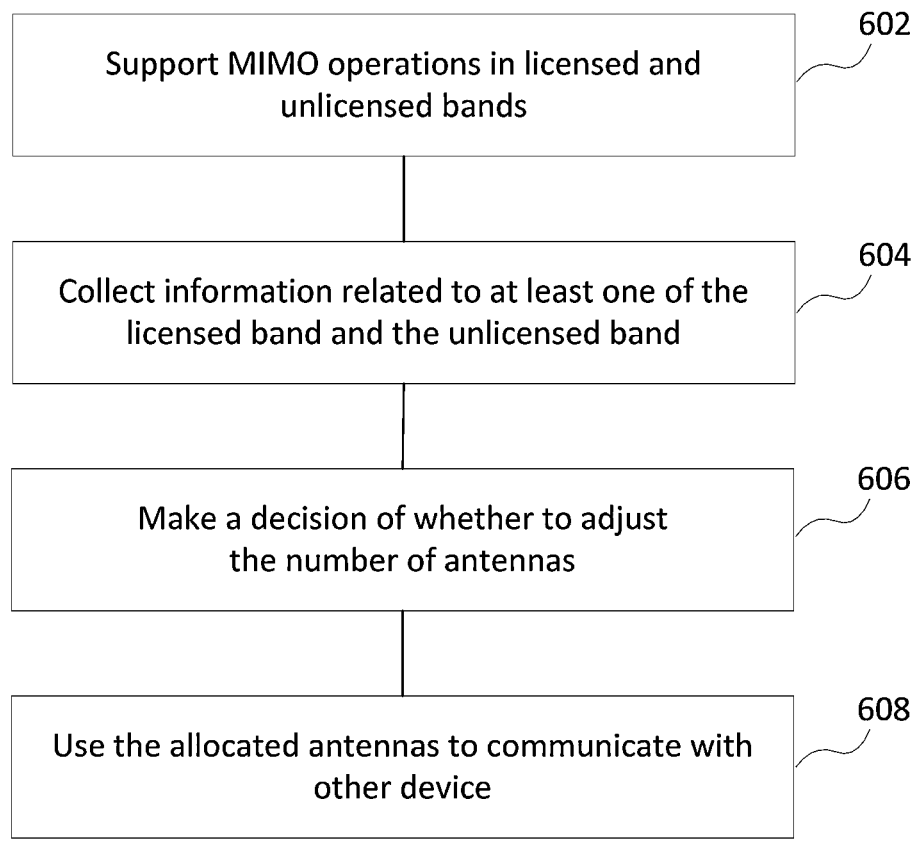
FIG. 6 is a diagram illustrating an exemplary antenna allocation procedure according to some embodiments of the present disclosure.

FIG. 6 is a diagram illustrating an exemplary antenna allocation procedure according to some embodiments of the present disclosure. The exemplary antenna allocation procedure illustrated in FIG. 6 may be performed by a radio device, such as a network node or a terminal device in a wireless communication network. According to the exemplary procedure shown in FIG. 6, the radio device can make adaptive allocation of multiple antennas between a licensed band and an unlicensed band.

As shown in block 602, the radio device can support MIMO operations in licensed and unlicensed bands. An antenna allocation rule as described in connection with FIG. 4 or FIG. 5 may be predefined for the radio device. According to the antenna allocation rule, the radio device may collect information related to at least one of the licensed band and the unlicensed band, as shown in block 604.

In accordance with an exemplary embodiment where the radio device such as an eNB/gNB performs the procedure illustrated in FIG. 6, the eNB/gNB may collect the required information by, for example, calculating the EIRP per beam in the unlicensed band, checking the busy status in the unlicensed band, and/or determining the ratio of cell edge users or the SIR status of users in the licensed band.

In accordance with an exemplary embodiment where the radio device such as a UE performs the procedure illustrated in FIG. 6, the UE may collect the required information by, for example, calculating the EIRP per beam in the unlicensed band, determining the UE's SIR value in the licensed band, and/or checking the load status in the licensed band.

Optionally, operations for collecting information may be performed in parallel or in a specified order as required. Based at least in part on the collected information, the radio device can make a decision of whether to adjust the number of antennas allocated in the licensed band and/or the unlicensed band, according to the antenna allocation rule, as shown in block 606. For example, the EIRP limit in the unlicensed band may determine the maximum number of antennas allocated in the unlicensed band. A high SIR value in the licensed band may mean that there is no need to increase the number of antennas allocated in the licensed band. In addition, if there is a heavy load in the licensed band, the radio device may consider increasing the number of antennas allocated in the unlicensed band. Optionally, different antenna allocation rules may be adopted in various application scenarios. Thus, the antenna allocation for the radio device may be dynamically changed with different antenna allocation rules.

In accordance with an exemplary embodiment, the fixed number of antennas may be shared between two frequency bands. In this case, increasing the number of antennas allocated in one frequency band means decreasing the number of antennas allocated in the other frequency band. Alternatively, the total number of antennas configured for the two frequency bands may be variable. In this regard, the antenna allocation in one frequency band may be independent of the antenna allocation in the other frequency band.

According to the procedure shown in FIG. 6, the radio device may use the allocated antennas to communicate with other device, as shown in block 608. Optionally, the procedure as illustrated in FIG. 6 also may be performed by the other device such as a UE or an eNB/gNB. In accordance with an exemplary embodiment, the radio device and the other device may exchange the latest antenna allocation information with each other. For example, such information exchange may be triggered by a change of antenna allocation for the radio device or the other device. Accordingly, the radio device and/or the other device can perform a proper link adaptation process according to the received antenna allocation information.

The proposed solution according to one or more exemplary embodiments can enable multiple antennas to be allocated or shared between different frequency bands. Taking the advantage of the proposed antenna configuration mechanism makes it possible to dynamically adjust antenna allocation in different frequency bands such as licensed and unlicensed bands, for example, according to various channel features and/or network configurations. In this way, antenna resources may be efficiently utilized at the eNb/gNB side and/or the UE side, and the system performance may be improved to fulfill various service requirements.

The various blocks shown in FIG. 4-6 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 7:
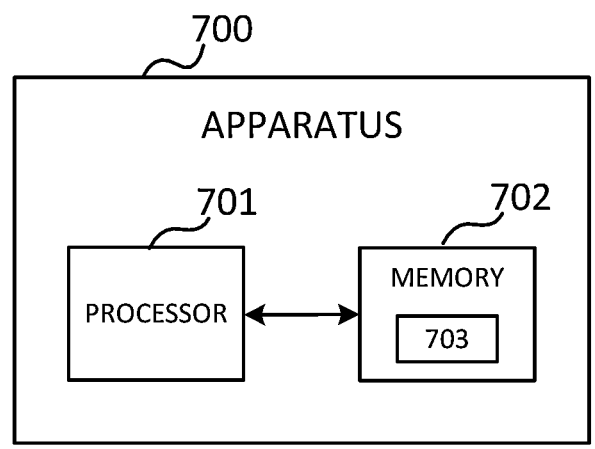
FIG. 7 is a block diagram illustrating an apparatus according to some embodiments of the present disclosure.

FIG. 7 is a block diagram illustrating an apparatus 700 according to various embodiments of the present disclosure. As shown in FIG. 7, the apparatus 700 may comprise one or more processors such as processor 701 and one or more memories such as memory 702 storing computer program codes 703. The memory 702 may be non-transitory machine/processor/computer readable storage medium. In some implementations, the one or more memories 702 and the computer program codes 703 may be configured to, with the one or more processors 701, cause the apparatus 700 at least to perform any operation of the method as described in connection with FIG. 4. In other implementations, the one or more memories 702 and the computer program codes 703 may be configured to, with the one or more processors 701, cause the apparatus 700 at least to perform any operation of the method as described in connection with FIG. 5.

Alternatively or additionally, the one or more memories 702 and the computer program codes 703 may be configured to, with the one or more processors 701, cause the apparatus 700 at least to perform more or less operations to implement the proposed methods according to the exemplary embodiments of the present disclosure.

Figure 8:
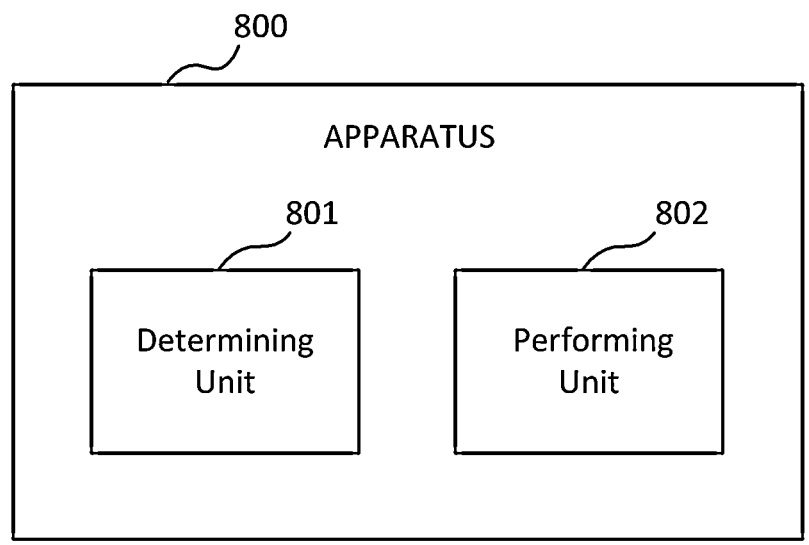
FIG. 8 is a block diagram illustrating another apparatus according to some embodiments of the present disclosure.

FIG. 8 is a block diagram illustrating an apparatus 800 according to some embodiments of the present disclosure. As shown in FIG. 8, the apparatus 800 may comprise a determining unit 801 and a performing unit 802. In an exemplary embodiment, the apparatus 800 may be implemented at a terminal device such as a UE. The determining unit 801 may be operable to carry out the operation in block 402, and the performing unit 802 may be operable to carry out the operation in block 404. Optionally, the determining unit 801 and/or the performing unit 802 may be operable to carry out more or less operations to implement the proposed methods according to the exemplary embodiments of the present disclosure.

Figure 9:
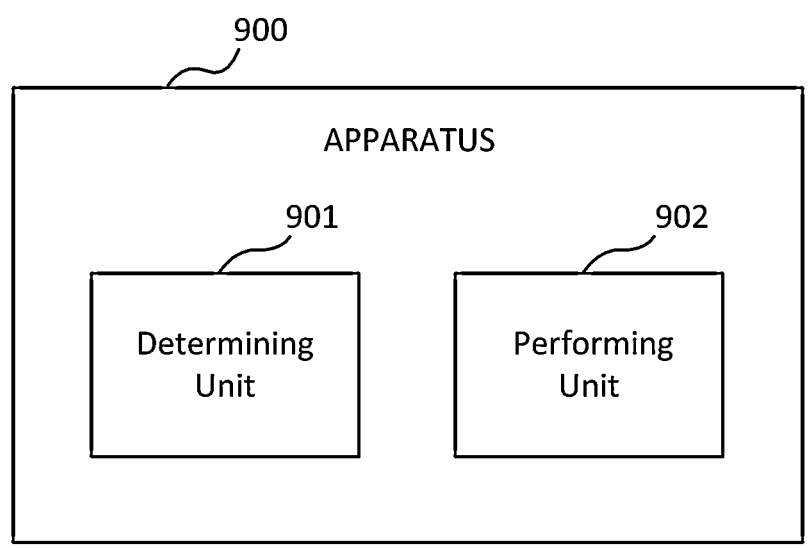
FIG. 9 is a block diagram illustrating yet another apparatus according to some embodiments of the present disclosure.

FIG. 9 is a block diagram illustrating an apparatus 900 according to some embodiments of the present disclosure. As shown in FIG. 9, the apparatus 900 may comprise a determining unit 901 and a performing unit 902. In an exemplary embodiment, the apparatus 900 may be implemented at a network node such as an eNB/gNB. The determining unit 901 may be operable to carry out the operation in block 502, and the performing unit 902 may be operable to carry out the operation in block 504. Optionally, the determining unit 901 and/or the performing unit 902 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method implemented at a terminal device, comprising:
    determining status information of a first frequency band and a second frequency band, wherein the terminal device is operable in the first frequency band and the second frequency band;
    performing an allocation of multiple antennas of the terminal device between the first frequency band and the second frequency band based on the status information; and
    transmitting terminal configuration information to a network node, wherein the terminal configuration information indicates the allocation of the multiple antennas of the terminal device between the first frequency band and the second frequency band,
    wherein the status information comprises a radiated power limit, channel quality and availability of resources, and wherein the radiated power limit, the channel quality and the availability of resources are associated with different priorities or weights to reflect different effects on the allocation of the multiple antennas, and wherein a final allocation depends on the status information in which the radiated power limit in one of the first frequency band and the second frequency band has the highest priority or weight.

2. The method according to claim 1, wherein the status information comprises at least one of the following:
    channel quality of the terminal device in the first frequency band; and
    availability of resources in the first frequency band for the terminal device.

3. The method according to claim 1, further comprising:
    transmitting a terminal update report to the network node, in response to a change of antenna allocation for the terminal device in at least one of the first frequency band and the second frequency band, wherein the terminal update report indicates the change of the antenna allocation for the terminal device.

4. The method according to claim 1, further comprising:
receiving network configuration information from a network node, wherein the network configuration information indicates an allocation of multiple antennas of the network node between the first frequency band and the second frequency band; and
determining a link adaptation process for the terminal device, based at least in part on the network configuration information.

5. The method according to claim 4, further comprising:
receiving a network update report from the network node, wherein the network update report indicates a change of antenna allocation for the network node in at least one of the first frequency band and the second frequency band; and
adjusting the link adaptation process for the terminal device, based at least in part on the network update report.

6. The method according to claim 1, wherein the first frequency band comprises a licensed band and the second frequency band comprises an unlicensed band.

7. An apparatus, comprising:
one or more processors; and
one or more memories comprising computer program codes,
the one or more memories and the computer program codes configured to, with the one or more processors, cause the apparatus at least to:
determine status information of a first frequency band and a second frequency band, wherein the apparatus is operable in the first frequency band and the second frequency band;
perform an allocation of multiple antennas of the apparatus between the first frequency band and the second frequency band based on the status information; and
transmit terminal configuration information to a network node, wherein the terminal configuration information indicates the allocation of the multiple antennas of the apparatus between the first frequency band and the second frequency band,
wherein the status information comprises a radiated power limit, channel quality and availability of resources, and wherein the radiated power limit, the channel quality and the availability of resources are associated with different priorities or weights to reflect different effects on the allocation of the multiple antennas, and wherein a final allocation depends on the status information in which the radiated power limit in one of the first frequency band and the second frequency band has the highest priority or weight.

8. The apparatus according to claim 7, wherein the status information comprises at least one of the following:
channel quality of the apparatus in the first frequency band; and
availability of resources in the first frequency band for the apparatus.

9. The apparatus according to claim 7, wherein the one or more memories and the computer program codes are configured to, with the one or more processors, cause the apparatus further to:
transmit a terminal update report to the network node, in response to a change of antenna allocation for the apparatus in at least one of the first frequency band and the second frequency band, wherein the terminal update report indicates the change of the antenna allocation for the apparatus.

10. The apparatus according to claim 7, wherein the one or more memories and the computer program codes are configured to, with the one or more processors, cause the apparatus further to:
receive network configuration information from a network node, wherein the network configuration information indicates an allocation of multiple antennas of the network node between the first frequency band and the second frequency band; and
determine a link adaptation process for the apparatus, based at least in part on the network configuration information.

11. The apparatus according to claim 10, wherein the one or more memories and the computer program codes are configured to, with the one or more processors, cause the apparatus further to:
receive a network update report from the network node, wherein the network update report indicates a change of antenna allocation for the network node in at least one of the first frequency band and the second frequency band; and
adjust the link adaptation process for the apparatus, based at least in part on the network update report.

12. The apparatus according to claim 7, wherein the first frequency band comprises a licensed band and the second frequency band comprises an unlicensed band.

13. A method implemented at a network node, comprising:
determining status information of a first frequency band and a second frequency band, wherein the network node is operable in the first frequency band and the second frequency band; and
performing an allocation of multiple antennas of the network node between the first frequency band and the second frequency band based on the status information,
wherein the status information comprises a radiated power limit, channel quality and availability of resources, and wherein the radiated power limit, the channel quality and the availability of resources are associated with different priorities or weights to reflect different effects on the allocation of the multiple antennas, and wherein a final allocation depends on the status information in which the radiated power limit in one of the first frequency band and the second frequency band has the highest priority or weight.

14. The method according to claim 13, wherein the status information comprises at least one of the following:
availability of resources in the second frequency band for the network node; and
channel quality of terminal devices served by the network node in the first frequency band.

15. The method according to claim 13, further comprising:
transmitting network configuration information to a terminal device, wherein the network configuration information indicates the allocation of the multiple antennas of the network node between the first frequency band and the second frequency band.

16. The method according to claim 15, further comprising:
transmitting a network update report to the terminal device, in response to a change of antenna allocation for the network node in at least one of the first frequency band and the second frequency band, wherein the network update report indicates the change of the antenna allocation for the network node.

17. The method according to claim 13, further comprising:
receiving terminal configuration information from a terminal device, wherein the terminal configuration information indicates an allocation of multiple antennas of the terminal device between the first frequency band and the second frequency band; and
determining a link adaptation process for the network node, based at least in part on the terminal configuration information.

18. The method according to claim 17, further comprising:
receiving a terminal update report from the terminal device, wherein the terminal update report indicates a change of antenna allocation for the terminal device in at least one of the first frequency band and the second frequency band; and
adjusting the link adaptation process for the network node, based at least in part on the terminal update report.

19. The method according to claim 13, wherein the first frequency band comprises a licensed band and the second frequency band comprises an unlicensed band.

20. An apparatus implemented in a network node or communicatively coupled to a network node, comprising:
one or more processors; and
one or more memories comprising computer program codes,
the one or more memories and the computer program codes configured to, with the one or more processors, cause the apparatus at least to:
determine status information of a first frequency band and a second frequency band, wherein the apparatus is operable in the first frequency band and the second frequency band; and
perform an allocation of multiple antennas of the apparatus between the first frequency band and the second frequency band based on the status information,
wherein the status information comprises a radiated power limit, channel quality and availability of resources, and wherein the radiated power limit, the channel quality and the availability of resources are associated with different priorities or weights to reflect different effects on the allocation of the multiple antennas, and wherein a final allocation depends on the status information in which the radiated power limit in one of the first frequency band and the second frequency band has the highest priority or weight.

21. The apparatus according to claim 20, wherein the status information comprises at least one of the following:
availability of resources in the second frequency band for the apparatus; and
channel quality of terminal devices served by the apparatus in the first frequency band.

22. The apparatus according to claim 20, wherein the one or more memories and the computer program codes are configured to, with the one or more processors, cause the apparatus further to:
transmit network configuration information to a terminal device, wherein the network configuration information indicates the allocation of the multiple antennas of the apparatus between the first frequency band and the second frequency band.

23. The apparatus according to claim 22, wherein the one or more memories and the computer program codes are configured to, with the one or more processors, cause the apparatus further to:
transmit a network update report to the terminal device, in response to a change of antenna allocation for the apparatus in at least one of the first frequency band and the second frequency band, wherein the network update report indicates the change of the antenna allocation for the apparatus.

24. The apparatus according to claim 20, wherein the one or more memories and the computer program codes are configured to, with the one or more processors, cause the apparatus further to:
receive terminal configuration information from a terminal device, wherein the terminal configuration information indicates an allocation of multiple antennas of the terminal device between the first frequency band and the second frequency band; and
determine a link adaptation process for the apparatus, based at least in part on the terminal configuration information.

25. The apparatus according to claim 24, wherein the one or more memories and the computer program codes are configured to, with the one or more processors, cause the apparatus further to:
receive a terminal update report from the terminal device, wherein the terminal update report indicates a change of antenna allocation for the terminal device in at least one of the first frequency band and the second frequency band; and
adjust the link adaptation process for the apparatus, based at least in part on the terminal update report.

26. The apparatus according to claim 20, wherein the first frequency band comprises a licensed band and the second frequency band comprises an unlicensed band.

* * * * *